United States Patent [19]
Okuda et al.

[11] Patent Number: 5,637,137
[45] Date of Patent: Jun. 10, 1997

[54] EMULSION INK FOR STENCIL PRINTING

[75] Inventors: Sadanao Okuda; Yoshihiro Hayashi, both of Tokyo, Japan

[73] Assignee: Riso Kagaku Corporation, Tokyo, Japan

[21] Appl. No.: 597,984

[22] Filed: Feb. 7, 1996

[30] Foreign Application Priority Data

Feb. 13, 1995 [JP] Japan ................................. 7-024373

[51] Int. Cl.$^6$ .................................................. C09D 11/02
[52] U.S. Cl. ................................. 106/31.26; 106/31.28
[58] Field of Search .......................... 106/20 R, 27 R, 106/30 R

[56] References Cited

U.S. PATENT DOCUMENTS

| | | | |
|---|---|---|---|
| 5,389,130 | 2/1995 | Batlaw et al. | 106/28 R |
| 5,395,435 | 3/1995 | Mizobuchi | 106/28 R |
| 5,429,841 | 7/1995 | Batlaw et al. | 106/23 D |

*Primary Examiner*—Helene Klemanski
*Attorney, Agent, or Firm*—Fay, Sharpe, Beall, Fagan, Minnich & McKee

[57] ABSTRACT

An emulsion ink for stencil printing of a water-in-oil (W/O) having an oil phase and a water phase is disclosed which emulsion ink is characterized in that the water phase contains an extender pigment. The emulsion ink can provide printed images having a high print concentration and a constant quality without causing strike through, offset, and bleeding of ink.

6 Claims, No Drawings

EMULSION INK FOR STENCIL PRINTING

BACKGROUND OF THE INVENTION

1. Field of the Invention

The present invention relates to an emulsion ink for stencil printing. More specifically, the present invention relates to an emulsion ink for stencil printing which can provide printed images (or printed pictures) having a high concentration and a constant quality despite of the type of printing papers and irrespective of presence or no presence of unevenness on the surface of printing papers, and causing no bleeding, no strike through, and no offset of printing ink.

2. Description of the Prior Art

In a stencil printing, a plate-making is first carried out by using a stencil printing master sheet and then ink is supplied through the perforations formed in the master sheet to print a body to be printed such as paper. Since preparation of perforated stencil printing sheets is easy, stencil printing is used in diversified applications.

As the ink used for stencil printing, water-in-oil (W/O) emulsion inks are generally used. Drying of these emulsion inks are carried out by splashing water components in the air and at the same time permeating ink components into printing paper to be printed (Unexamined Japanese Patent Publication Nos. 61-255967, 64-14284, 4-132777, and 5-117565).

However, with conventional W/O emulsion inks, ink components permeate into printing paper when the ink is dried, and at the same time, a colorant also permeates into the printing paper. Accordingly, there are problems that the amount of the colorant remaining on the surface of the paper is decreased and thus printing concentration is reduced. Besides, since the colorant in the ink permeates into the printing paper, so called strike through phenomenon in which reversed printed images can be seen through a back surface of the paper is easy to occur.

Further, since the permeation rate of ink components into the paper is varied depending on the type of papers, there are problems that the concentration of printed images to be obtained, and the extent of bleeding, strike through, and offset of ink are varied according to the type of papers. That is, when the permeation rate of ink into paper is high, ink components permeate into the paper with almost no ink remaining on the surface of paper. Thus, printing concentration is decreased and strike through of ink is increased, whereas offset of ink is decreased since ink components will not remain on the surface of paper. On the other hand, when the permeating rate is low, since ink components tend to remain on the surface of paper, printing concentration of printed images is increased and strike through is reduced. However, the offset is increased since a large part of ink components remain on the surface of paper.

Accordingly, it has been desired to provide an emulsion ink for stencil printing which can provide printed images having a high concentration without being affected by permeation rate of ink into printing paper, and at the same time causing no strike through and offset of ink.

Still further, since drying of emulsion ink is performed by permeation of ink components into paper, when stencil printing is conducted by using a sheet of paper having unevenness on its surface, it becomes difficult to obtain printed images of gloss tone depending on the type of paper. Such phenomenon can be observed even with a high grade paper (wood free paper) and medium grade paper, and particularly with low grade paper. Accordingly, quality of printed images to be obtained is varied depending on presence or no presence of unevenness on the surface of paper, and such phenomenon remarkably appears particularly when full color printing was performed.

Moreover, in stencil printing, since ink is extruded through perforations to supply it to printing paper, the ink must have been imparted with a certain extent of viscosity. When the impartment of viscosity is achieved with a macromolecular compound such as a resin to be contained in an oil phase, the rate of permeation of ink is decreased and the strike through becomes easy to occur.

SUMMARY OF THE INVENTION

An object of the present invention is to solve the problems in the prior art mentioned above, and to provide an emulsion ink for stencil printing which can provide printed images having a high concentration and a constant quality despite of the type of printing paper and irrespective of presence or no presence of unevenness on the surface of printing paper, and causing no bleeding, no strike through, and no offset of printing ink.

Aspects of the present invention are summarized as follows:

(1) An emulsion ink for stencil printing of a water-in-oil (W/O) having an oil phase and a water phase and containing an extender pigment in the water phase.

(2) The emulsion ink for stencil printing according to claim 1 wherein the extender pigment is contained in an amount of 1 to 50% by weight based on the total weight of the emulsion ink.

(3) The emulsion ink for stencil printing according to claim 1 or 2 wherein the oil phase contains a colorant, resin, non-volatile solvent, volatile solvent, and emulsifier, and the water phase contains an oil in water (O/W) resin emulsion, a water soluble macromolecular compound, or a mixture thereof.

(4) The emulsion ink for stencil printing according to claim 1 or 2 wherein the oil phase contains a non-volatile solvent, volatile solvent, and emulsifier, and the water phase contains a colorant, and an oil-in-water (O/W) resin emulsion, a water soluble macromolecular compound, or a mixture thereof.

DESCRIPTION OF THE PREFERRED EMBODIMENTS

In the present invention, when an extender pigment is contained in a water phase of W/O emulsion inks, the extender pigment can not permeate into paper having a porous structure since the extender pigment is in the form of fine particles, and thus the extender pigment is stagnated on the surface of paper. This is because the water phase which is a dispersion medium for the extender pigment has a fluidity and permeates into paper of a porous structure, and fluidic components other than the extender pigment in the water phase permeates into paper. As the result, the extender pigment remains on the surface of paper, a large part of the colorant component can be held on the surface of paper, printing concentration is not decreased after ink drying, and strike through of ink is decreased.

Since an extender pigment is contained in a water phase in the present invention, the same extent of ink permeation rate as that of conventional emulsion ink can be obtained and the increase in offset of ink can be prevented.

According to the present invention, even if unevenness existed on the surface of printing paper, printing in a gloss tone becomes possible since the depressions on the surface of such paper can be filled up with an extender pigment in ink, and printed images of a constant quality can be obtained even when printing was conducted in a full color.

Further, according to the present invention, since the impartment of viscosity to the ink for stencil printing can be performed by addition of an extender pigment, it is possible to prepare an emulsion ink suited for stencil printing without reducing the permeation rate of ink compared with the case where a macromolecular compound such as a resin is added to an oil phase to impart the viscosity.

A W/O emulsion ink in the present invention can be prepared by, for instance, gradually adding 90 to 30% by weight of a water phase (W) to 10 to 70% by weight of an oil phase (O) and emulsifying them.

In the present invention, the water phase contains an extender pigment. Such extender pigment is a colorless pigment even if it is contained in ink, and has a function of preventing a colorant from permeating into paper at the time when ink components permeate into printing paper and holding the colorant on the surface of printing paper.

The type of extender pigment is not particularly restricted as long as it is in a form of water insoluble fine particles, and it includes, for examples, inorganic fine particles such as those of white clay, talc, clay, diatomaceous earth, calcium carbonate, barium sulfate, titanium oxide, alumina white, silica, kaolin, mica, and aluminum hydroxide; and organic fine particles such as those of polyacrylic acid ester, polyurethane, polyester, polyethylene, polypropylene, polyvinyl chloride, polyvinilidene chloride, polystyrene, polysiloxane, phenol resin, epoxy resin, and benzoguanamine resin, and their copolymers.

The amount of the extender pigment to be added is preferably 1 to 50% by weight, more desirably 5 to 20% by weight based on the total weight of the emulsion ink. When the amount of the extender pigment to be added is too small, effects on print concentration on printed matter and strike through become small. However, when the amount is too large, the ink becomes unsuitable to stencil printing and difficult to extrude through perforations.

Average particle size of the extender particle is not particularly restricted, and the size of such an extent as not destroying the emulsion ink can be used. Specifically, the average particle size of the extender pigment is preferably less than 10 μm.

It is preferable to add an O/W resin emulsion, a water soluble macromolecular compound, or their mixture in the water phase to improve the dispersibility of the extender pigment and to improve its fixing ability to paper.

As the O/W resin emulsion, a resin emulsion can be used such as that of polyvinyl acetate, ethylene-vinyl acetate copolymer, vinyl acetate-acrylic ester copolymer, polymethacrylic ester, polystyrene, styrene-acrylic ester copolymer, styrene-butadiene copolymer, vinylidene chloride-acrylic ester copolymer, vinyl chloride, vinyl chloride-vinyl acetate copolymer, and polyurethane. As the water soluble macromolecular compound, a water soluble resin can be used such as polyvinyl alcohol, methyl cellulose, carboxymethyl cellulose, hydroxymethyl cellulose, polyvinyl pyrrolidone, ethylene-vinyl alcohol copolymer, polyethylene oxide, polyvinyl ether, polyacrylamide, gum arabic, starch, and water soluble urethane.

The amount of these resin components is preferably 20% by weight or less, more desirably 10% by weight or less, calculated in terms of solid, based on the total weight of emulsion ink. When the amount of the resin components to be added is too large, the resin components sometimes form a film at the portions of perforations on the printing sheet and prevent the passage of ink at the time of printing if the ink was put on the sheet and allowed to stand for a long period of time.

The water phase can be added with a surfactant and other materials to improve wettability and dispersibility of the extender pigment to water. Further, the water phase can be added, when necessary, with a water soluble additive such as a wetting agent, electrolyte, antifungal agent, antioxidant, and agent for retarding water evaporation.

The water phase may contain a colorant. In this case, existence of an O/W resin emulsion, a water soluble resin, or their mixture improves the dispersibility of the colorant and its fixing ability to paper as in the case of the extender pigment mentioned above.

As the colorant, a known pigment can be used. For instance, carbon blacks such as a furnace carbon black, lamp black, acetylene black, and channel black; metals or metal oxides such as copper, iron, titanium oxide, and calcium carbonate; and organic pigments such as azo, cyanine, dioxazine, and quinacridone type pigment can be used for monochrome printing.

In the present invention, whereas a colorant, resin, nonvolatile solvent, volatile solvent, and emulsifier may be added in the oil phase, the colorant as well as resin components may be omitted from the oil phase when a colorant was added in the water phase. This is because the resin components are blended to improve the dispersibility of the colorant and for other purposes.

When a colorant is contained in the oil phase, the same type of colorant as mentioned above may be used. As the resin, for example, a phenol resin, maleic acid resin, petroleum resin, and alkyd resin can be used.

As the non-volatile solvent, a mineral oil such as a motor oil, spindle oil, machine oil, and liquid paraffin, and a vegetable oil such as an olive oil, castor oil, and salad oil can be used. As the volatile solvent, a known mineral type oil and vegetable type oil can be used. The ratio of these solvents to be used (non-volatile solvent/volatile solvent) is different depending on the ratio of the oil phase to water phase, but it is preferably in the range of 50–95/50–5 by weight.

An emulsifier is used for forming a W/O emulsion, and a nonionic surface active agent is preferably used. For instance, sorbitan higher fatty acid esters such as sorbitan monolaurate, sorbitan monopalmitate, sorbitan monostearate, sorbitan tristearate, sorbitan monooleate, and sorbitan sesquioleate; fatty acid monoglycerides; fatty acid diglycerides; and ethylene oxide adducts, for example, of a higher alcohol, alkyl phenol, or fatty acid can be exemplified.

EXAMPLES

The present invention will be described in more detail with reference to Examples. However, it should be understood that the present invention is by no means restricted by such Examples. In the Examples, "parts" means "parts by weight" unless specified otherwise.

Examples 1 to 4 and Comparative Example 1

W/O emulsion inks were prepared, respectively, by the following method by using the formulation shown in Table 1:

First, alkyd resin, furnace carbon black, sorbitan monooleate, motor oil No. 40, and solvent No. 5 were added to each other, sufficiently stirred, and then sufficiently kneaded with triple rolls to prepare an oil phase. Next, a liquid mixture comprising water, an extender pigment, polyvinyl pyrrolidone, and ethylene glycol was dispersed with a ball mill. The water dispersion was stirred with a stirrer while being gradually added to the oil phase mentioned above to form an emulsion and to prepare a W/O emulsion ink.

Example 5

After the same oil phase as in Example 1 was kneaded to the same condition as in Example 1, emulsification was performed in the same way as in Example 1 while gradually adding a dispersion comprising water, an extender pigment, polyvinyl pyrrolidone, and ethylene glycol. Then, further emulsification was performed while gradually adding an O/W emulsion to prepare a W/O emulsion ink.

Example 6

W/O emulsion inks were prepared, respectively, by the following method by using the formulation shown in Table 1:

First, sorbitan monooleate, motor oil No. 40, and solvent No. 5 were added to each other, sufficiently stirred to obtain an oil phase. Then, a liquid mixture comprising water, an extender pigment, polyvinyl pyrrolidone, and ethylene glycol was dispersed with a ball mill. The water dispersion was stirred with a stirrer while being gradually added to the oil phase mentioned above to form an emulsion. Subsequently, a dispersion of furnace carbon black dispersed with polyvinyl pyrrolidone was gradually added to emulsify and to prepare a W/O emulsion ink.

Average particle size of an extender pigment shown in Table 1 was determined with a centrifugal particle size measuring apparatus (CAPA-700 manufactured by Horiba, Ltd.).

<Test Example>

By using each of the emulsion inks for stencil printing obtained in Examples 1 to 6 and Comparative Example 1, stencil printing was carried on a high grade paper by means of a stencil printing machine, Risograph RC115D (Registered trademark; product of Riso Kagaku Corporation). Evaluation on print concentration on printed matters, strike through, offset and bleeding as well as determination of the print concentration when the printing was carried out on sheets of a low grade paper (ground wood paper) having unevenness on its surface were conducted by the following methods and the results are shown in Table 2:

(1) Print concentration: The print concentration at printed set-solid portions was determined by an OD meter (RD-920 produced by Macbeth Co.).

(2) Strike through: The concentration on the rear surface side of the printed set-solid portion was determined by the OD meter (the same as above).

(3) Offset: Printing was continuously conducted for 100 sheets of paper, and blot on the reverse side of printed face was observed through naked eye, and the case where no blot occurred was graded as 0, but the case where blot occurred was graded as x.

(4) Bleeding: Bleeding condition at the portions where ink was adhered was observed by using a microscope (80x). In the case when the bleeding was little, it was graded as ○, but in the case when bleeding was conspicuous, it was graded as x.

(5) Print concentration on a sheet of a low grade paper: Determined by the same method as in (1).

TABLE 2

|  | Example | | | | | | Comp. Example |
| --- | --- | --- | --- | --- | --- | --- | --- |
|  | 1 | 2 | 3 | 4 | 5 | 6 | 1 |
| Print concentration | 1.22 | 1.25 | 1.20 | 1.18 | 1.26 | 1.35 | 0.95 |
| Strike through | 0.06 | 0.07 | 0.07 | 0.07 | 0.08 | 0.08 | 0.25 |
| Offset | ○ | ○ | ○ | ○ | ○ | ○ | ○ |
| Bleeding | ○ | ○ | ○ | ○ | ○ | ○ | X |
| Print concentration on sheet of low grade paper | 1.20 | 1.22 | 0.20 | 1.19 | 1.22 | 1.30 | 0.85 |

According to the present invention, an emulsion ink for stencil printing can be provided from which printed images having a high print concentration and a constant quality can be obtained despite of the type of printing papers and irrespective of presence or no presence of the unevenness, and through the use of the emulsion ink strike through, offset, and bleeding of ink can be prevented, because permeation of a colorant into printing paper can be prevented and the colorant can be held on the surface of the printing

TABLE 1

| Composition of emulsion ink (parts by weight) | | | Ex. 1 | Ex. 2 | Ex. 3 | Ex. 4 | Ex. 5 | Ex. 6 | Comp. Ex. 1 |
| --- | --- | --- | --- | --- | --- | --- | --- | --- | --- |
| Oil phase | Colorant (Furnace carbon black) | | 4.0 | 4.0 | 4.0 | 4.0 | 4.0 | — | 4.0 |
|  | Resin (Alkyd resin) | | 11.0 | 11.0 | 11.0 | 11.0 | 11.0 | — | 11.0 |
|  | Non-volatile solvent (Motor oil No. 40) | | 8.0 | 8.0 | 8.0 | 8.0 | 8.0 | 19.0 | 8.0 |
|  | Volatile solvent (Solvent No. 5) | | 5.0 | 5.0 | 5.0 | 5.0 | 5.0 | 4.0 | 5.0 |
|  | Emulsifier (Sorbitan monooleate) | | 2.0 | 2.0 | 2.0 | 2.0 | 2.0 | 2.0 | 2.0 |
| Water phase | Extender pigment | Calcium carbonate (average particle size: 0.2 μm) | 10.0 | — | — | — | 10.0 | 5.0 | — |
|  |  | Titanium oxide (average particle size: 3.5 μm) | — | 10.0 | — | — | — | — | — |
|  |  | Silica (average particle size: 1.6 μm) | — | — | 10.0 | — | — | — | — |
|  |  | Polyacrylic ester (average particle size: 1.7 μm) | — | — | — | 10.0 | — | — | — |
|  | Water (Deionized water) | | 53.0 | 53.0 | 53.0 | 53.0 | 43.0 | 53.0 | 53.0 |
|  | Water soluble resin (Polyvinyl pyrrolidone) | | 1.0 | 1.0 | 1.0 | 1.0 | 1.0 | 2.0 | 1.0 |
|  | (O/W) type resin (Polyvinyl pyrrolidone) | | — | — | — | — | 10.0 | 5.0 | — |
|  | Lubricant (Ethylene glycol) | | 6.0 | 6.0 | 6.0 | 6.0 | 6.0 | 6.0 | 6.0 |
|  | Colorant (Furnace carbon black) | | — | — | — | — | — | 4.0 | — | paper at the time of drying ink by adding an extender pigment in a water phase.

What is claimed is:

1. A water-in-oil emulsion ink for stencil printing having an oil phase and a water phase, containing a colorant in the oil phase or water phase, and containing an extender pigment in the water phase.

2. The emulsion ink for stencil printing according to claim 1 wherein the extender pigment is contained in an amount of 1 to 50% by weight based on the total weight of the emulsion ink.

3. The emulsion ink for stencil printing according to claim 1 wherein the oil phase contains a colorant, resin, non-volatile solvent, volatile solvent, and emulsifier, and the water phase contains an oil-in-water (O/W) resin emulsion, a water soluble macromolecular compound, or a mixture thereof.

4. The emulsion ink for stencil printing according to claim 1 wherein the oil phase contains a non-volatile solvent, volatile solvent, and emulsifier, and the water phase contains a colorant, and an oil-in-water (O/W) resin emulsion, a water soluble macromolecular compound, or a mixture thereof.

5. The emulsion ink for stencil printing according to claim 2 wherein the oil phase contains a colorant, resin, non-volatile solvent, volatile solvent, and emulsifier, and the water phase contains an oil-in-water (O/W) resin emulsion, a water soluble macromolecular compound, or a mixture thereof.

6. The emulsion ink for stencil printing according to claim 2 wherein the oil phase contains a non-volatile solvent, volatile solvent, and emulsifier, and the water phase contains a colorant, and an oil-in-water (O/W) resin emulsion, a water soluble macromolecular compound, or a mixture thereof.

\* \* \* \* \*